US006546626B2

United States Patent
Otte et al.

(10) Patent No.: US 6,546,626 B2
(45) Date of Patent: Apr. 15, 2003

(54) METHOD OF PRODUCING A PISTON

(75) Inventors: Bernhard Otte, Zirndorf (DE); Peter Konrad, Pegnitz (DE); Clemens Wallmann, Erlangen (DE); Hans Werner Waldmann, Neudrossenfeld (DE); Hans Wilhelm Bergmann, deceased, late of Gesees (DE), Gudrun Bergmann, legal representative

(73) Assignee: Federal-Mogul Nürnberg GmbH, Nuremberg (DE)

( * ) Notice: Subject to any disclaimer, the term of this patent is extended or adjusted under 35 U.S.C. 154(b) by 0 days.

(21) Appl. No.: 09/930,727

(22) Filed: Aug. 15, 2001

(65) Prior Publication Data
US 2002/0069528 A1 Jun. 13, 2002

(30) Foreign Application Priority Data
Sep. 13, 2000 (DE) .......................... 100 45 174

(51) Int. Cl.$^7$ ................................. B23P 15/00
(52) U.S. Cl. .................. 29/888.049; 29/557; 29/558
(58) Field of Search ................. 29/888.049, 557, 29/558; 219/121.64, 121.6, 121.65, 121.66, 121.85

(56) References Cited

U.S. PATENT DOCUMENTS

| 3,014,771 A | | 12/1961 | Nichols ................. 309/14 |
| 3,512,791 A | | 5/1970 | Daub ................... 277/189.5 |
| 3,715,790 A | * | 2/1973 | Reinberger .............. 277/456 |
| 4,125,926 A | * | 11/1978 | Gale et al. ............ 219/121.63 |
| 4,233,490 A | * | 11/1980 | Shalai et al. ............. 148/535 |
| 4,360,956 A | * | 11/1982 | Hiller ................. 219/121.35 |
| 4,432,313 A | | 2/1984 | Matlock ................ 123/193 P |
| 4,562,327 A | | 12/1985 | Mielke ................. 219/76.11 |
| 5,094,149 A | * | 3/1992 | Munro .................. 123/193.6 |
| 5,301,599 A | * | 4/1994 | Dearnley et al. ......... 123/193.6 |
| 5,515,770 A | * | 5/1996 | Clark et al. ............. 123/193.6 |
| 5,743,012 A | * | 4/1998 | Adams et al. ........... 29/888.043 |

FOREIGN PATENT DOCUMENTS

| DE | 2005663 | 8/1971 |
| DE | 2108170 | 8/1972 |
| DE | 2835332 | 2/1980 |
| DE | 2926699 | 1/1981 |
| DE | 3246630 | 6/1984 |
| DE | 3339867 | 5/1985 |
| DE | 3405983 | 5/1985 |
| DE | 19833825 | 12/1999 |
| DE | 19833827 | 12/1999 |
| EP | 0654596 | 5/1995 |
| EP | 0820831 | 1/1998 |
| GB | 1501342 | 2/1978 |
| GB | 2023765 | 1/1980 |

OTHER PUBLICATIONS

Patent Abstracts of Japan, Publication No. 2000 054910A (Feb. 2000).
Patent Abstracts of Japan, Publication No. 2000 054911A (Feb. 2000).

* cited by examiner

Primary Examiner—I Cuda Rosenbaum
(74) Attorney, Agent, or Firm—Cooper & Dunham LLP

(57) ABSTRACT

In a method of producing a piston (10) for an internal combustion engine including at least one strengthened piston ring groove at least one relatively narrow groove (14) is configured in the region of the upper and/or lower flank of the provided piston ring groove (18) and the groove (14) is filled with a hard-wearing material (16) and the piston ring groove (18) is worked out such that the upper and/or lower flank is formed at least in part by the hard-wearing material (16).

3 Claims, 1 Drawing Sheet

METHOD OF PRODUCING A PISTON

BACKGROUND OF THE INVENTION

1. Field of the Invention

The invention relates to a method of producing a piston for an internal combustion engine including at least one strengthened piston ring groove.

It is especially where highly loaded pistons are concerned in both diesel and petrol engines that the load on the topmost piston ring groove is particularly high. This is why this piston ring groove needs to be specially strengthened by special hard-wearing materials.

2. Prior Art

It is known from EP 0 654 596 A1 to include a ring of an iron based alloy in casting a piston body and to then work out the piston ring groove from this ring.

As an alternative, it is known to work out the groove from the material of the piston skirt and to render the flanks of the groove with good hard-wearing properties in a suitable subsequent process, by hard anodizing for example. In this case, however, high costs materialize from disposal of the ferrous alfin and waste chemicals as well as from the working processes involved.

Known from DE 198 33 827 C1 is to configure the strengthening of cermaic material in the region of the groove flanks which is likewise relatively complicated, however.

DE 34 05 983 C1 describes hardfacing the flanks of the piston ring grooves with austenic hard manganese steel. Such a method, however, exposes the piston to relatively high thermal stress. Furthermore, this requires a relatively large amount of strengthening or filler materials.

SUMMARY OF THE INVENTION

The invention is based on the objective of providing a method with which a piston for an internal combustion engine, requiring to comprise at least one strengthened piston ring groove, can now be produced at little expense.

The achievement of this objective reads from the method as described in claim 1.

In accordance therewith, a strengthened piston ring groove is configured on a piston for an internal combustion engine by configuring at least one, preferably two, relatively narrow grooves in the region of the upper and/or lower flank of the piston ring groove provided. More particularly, these grooves may be incised. Between the two grooves, or in the vicinity of the one groove, a web of the base material remains which, as described in the following, needs to be removed.

After the groove(s) have been configured, at the locations at which the upper and/or lower flanks of the piston ring groove is provided, these groove(s) are filled with a hard-wearing material preferably by means of a single-stage coating procedure. In conclusion, the piston ring groove is worked out of the piston such that the upper and/or lower flank of the piston ring groove is formed by the hard-wearing material. In other words, in the course of the last step, the web of base material remaining between the relatively narrow grooves as well as part of each filling of hard-wearing material are removed. Part of the filling, consisting of the hard-wearing material, remains at the upper and/or lower flank of the piston ring groove configured in this way, so that the at least one flank of the groove consists of a material, with the aid of which, the requirements on the flanks of the piston ring groove are satisfied.

The method in accordance with the invention offers the advantage of the piston being exposed to less thermal stress than is the case in known hardfacing. Furthermore, since only relatively narrow grooves are filled with the strengthening or filler material, less material is used. Due to the reduced filler volume less time is needed for processing. As compared to casting a ring of hard-wearing material in place in a base body of the base material and subsequently working out the groove from the cast-in place ring, the material requirement is likewise less. In conclusion, the consumption of strengthening material, processing time and other process parameters remain the same, irrespective of how the geometry and width of the ring groove is configured. In other words, the locations at which the relatively narrow grooves are configured, as well as their geometry and the geometry of the subsequently worked-out piston ring groove can now be freely selected without the method in accordance with the invention requiring any appreciable change or complication.

Preferably further embodiments of the invention are described in the further claims.

It is good practice to implement the step of filling the relatively narrow groove(s) configured in the base body by means of a laser or plasma source. By these steps in processing, advantageous filling of hard-wearing material is achievable at low expense.

Tests have furthermore indicated it to be of advantage to use microspraying for filling the groove(s).

In conclusion, use is made preferably of a wire- or powder-type material for the filling step. Such materials permit particularly good handling so that in this case a particularly simple variant of the method in accordance with the invention is achieved.

BRIEF DESCRIPTION OF THE DRAWINGS

The invention will now be detailed by way of an example embodiment as shown in the drawings in which.

DETAILED DESCRIPTION OF A PREFERRED EMBODIMENT OF THE INVENTION

Figure 1:
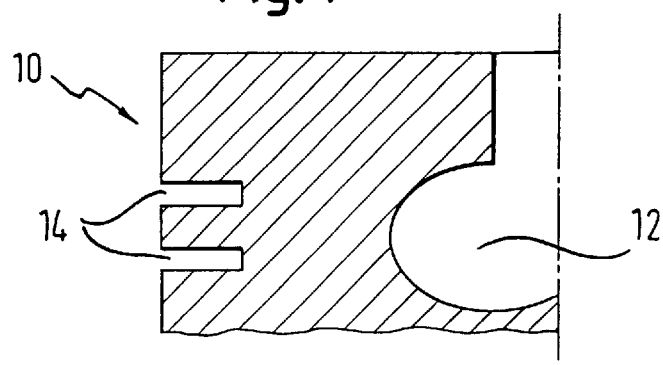
FIG. 1 is a section through part of the piston produced by the method in accordance with the invention in accordance with a first step in the method.

Referring now to FIG. 1 there is illustrated a section through part of a piston in which by means of the method in accordance with the invention a strengthened piston ring groove is to be configured. Evident is half of the piston as depicted in an upper portion thereof. More particularly, the piston comprises a bowl 12 in the piston crown. In a first step of the method in accordance with the invention, to configure a strengthened piston ring groove, two relatively narrow grooves 14 are configured at the locations at which the upper and lower flank of the piston ring groove is provided. The grooves 14 may be incised, for example.

Figure 2:
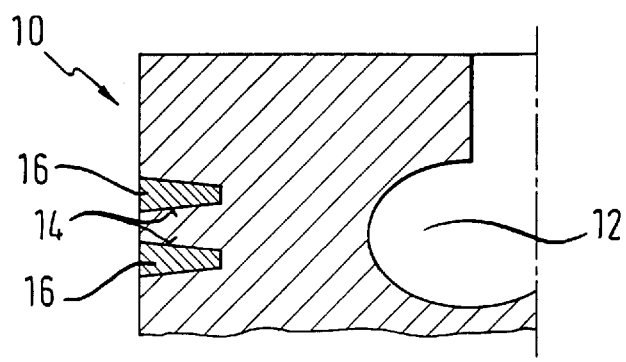
FIG. 2 is a section through part of the piston produced by the method in accordance with the invention in accordance with a second step in the method.

Referring now to FIG. 2 there is illustrated the same part of the piston 10 as shown in FIG. 1 as produced by a second step in the method. The two relatively narrow grooves 14 have been filled with a hard-wearing material 16. This is implementable by means of a laser or plasma source as well as by microspraying. The comparatively hard-wearing material 16 may exist initially in the form of a wire or powder.

Figure 3:
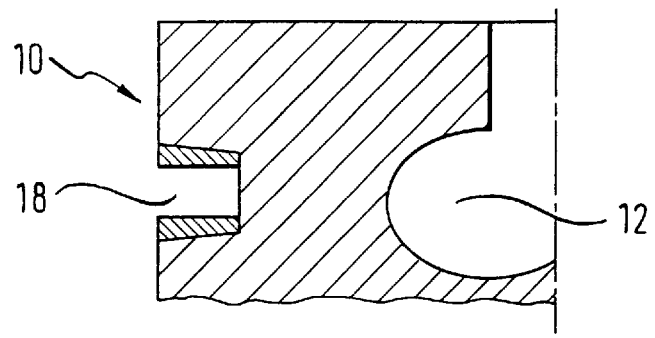
FIG. 3 is a section through a piston produced by means of the method in accordance with the invention.

Referring now to FIG. 3 there is illustrated how the strengthened piston ring groove 18 has been worked out from the material 16 as well as from the web remaining between the two grooves 14 from the base material of the piston. This step in the method takes place such that both the upper and lower flank of the piston ring groove 18 is configured at a location at which the relatively hard-wearing material 16 is likewise located, as a result of which, the flanks of the groove feature good hard-wearing properties. The invention offers the advantage that a piston ring groove configured in this way can now be achieved with relatively little hard-wearing material 16 since it is merely the two narrow grooves 14 that need to be filled therewith. Furthermore, the piston is exposed to less thermal stress than during conventional hard-facing. In conclusion, the time needed to configure the strengthened piston ring groove 18 is considerably reduced.

What is claimed is:

1. A method of producing a piston for an internal combustion engine, the piston being made of a base material and including at least one strengthened piston ring groove provided at a region of the piston and having upper and lower flanks, comprising the following steps:

(a) configuring at least one relatively narrow groove in the region at which said one strengthened piston ring groove is to be provided, each said relatively narrow groove corresponding in location to one of said upper and lower flanks, and a portion of said base material remaining in said region adjacent said one relatively narrow groove, (b) filling said one relatively narrow groove by means of a laser source with a hard-wearing material, and (c) working out said one strengthened piston ring groove such that one of said upper and lower flanks thereof is formed by said hard-wearing material, the working out step including removing said remaining portion of base material.

2. The method as set forth in claim 1, characterized in that filling said groove is done with the aid of a wire- or powder-type material.

3. The method as set forth in claim 1, wherein two of said relatively narrow grooves are configured in said region, said two relatively narrow grooves respectively corresponding in location to said upper and lower flanks and being spaced apart by said portion of said base material remaining in said region, wherein said two relatively narrow grooves are filled by means of said laser source with said hard-wearing material, and wherein, in the working out step, said upper and lower flanks are respectively formed by the hard-wearing material filling said two relatively narrow grooves with said remaining portion of base material being removed therebetween.

* * * * *